US009208711B2

(12) United States Patent
Shih et al.

(10) Patent No.: US 9,208,711 B2
(45) Date of Patent: Dec. 8, 2015

(54) APPARATUS AND METHOD FOR DRIVING DISPLAY

(75) Inventors: Chien-Chia Shih, Hsinchu (TW); Feng-Ting Pai, Hsinchu (TW); Po-Chen Lin, Taipei (TW); Shih-Hung Huang, Zhubei (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 172 days.

(21) Appl. No.: 13/438,608

(22) Filed: Apr. 3, 2012

(65) Prior Publication Data

US 2012/0299904 A1 Nov. 29, 2012

Related U.S. Application Data

(60) Provisional application No. 61/489,262, filed on May 24, 2011.

(30) Foreign Application Priority Data

Aug. 17, 2011 (TW) ............................ 100129440 A

(51) Int. Cl.
*G06F 3/038* (2013.01)
*G09G 3/20* (2006.01)

(52) U.S. Cl.
CPC .......... *G09G 3/20* (2013.01); *G09G 2300/0473* (2013.01); *G09G 2310/027* (2013.01); *G09G 2310/0248* (2013.01); *G09G 2330/025* (2013.01)

(58) Field of Classification Search
CPC ................ G09G 2310/027; G09G 2310/0289; G09G 3/2011; G09G 3/20; G09G 2300/0473; G09G 2310/025; G09G 2310/0248; G09G 2330/025; G11C 19/00; G11C 27/02; G06F 3/038
USPC ........ 345/204, 211–214, 98, 100; 349/19, 33; 315/169.2; 359/265
See application file for complete search history.

(56) References Cited

U.S. PATENT DOCUMENTS 7,221,304 B2 * 5/2007 Yen .............................. 341/145
7,675,322 B2 * 3/2010 Park ............................... 326/81
7,948,810 B1 * 5/2011 Tang et al. .............. 365/189.11
8,270,234 B1 * 9/2012 Tang et al. .............. 365/189.11
2002/0005832 A1 * 1/2002 Katase ......................... 345/107
2002/0105492 A1 8/2002 Kosaka
2006/0109229 A1 * 5/2006 Iwabuchi ....................... 345/98
2008/0143700 A1 * 6/2008 Shin et al. .................... 345/208
2009/0189882 A1 * 7/2009 Huang et al. ................. 345/211
2010/0109705 A1 * 5/2010 Pamperin ....................... 326/68
2010/0277509 A1 * 11/2010 Lu et al. ....................... 345/690
2011/0050749 A1 * 3/2011 Park ............................. 345/690
2011/0063283 A1 * 3/2011 Ryu et al. ..................... 345/214

* cited by examiner

*Primary Examiner* — Lun-Yi Lao
*Assistant Examiner* — Elliott Deaderick
(74) *Attorney, Agent, or Firm* — Rabin & Berdo, P.C.

(57) ABSTRACT

An apparatus for driving a display includes a shift register, a first latch unit, a second latch unit, a data comparison unit and a level select unit. The shift register generates multiple latch signals according to a sync signal. The first latch unit latches a data signal in response to the latch signals to obtain multiple first data corresponding to multiple channels. The second latch unit is coupled to the first latch unit and latches the first data of the channels as multiple second data in response to a latch data signal. The data comparison unit responds to the latch data signal to respectively compare the first data and the second data corresponding to the same channel to output multiple third data corresponding to the channels. The level select unit selects multiple voltage levels corresponding to the channels according to the third data.

38 Claims, 6 Drawing Sheets

| First data | Second data | Third data |
|---|---|---|
| 00 | 00 | 00 |
| 00 | 01 | 00 |
| 00 | 10 | 00 |
| 00 | 11 | 00 |
| 01 | 00 | 01 |
| 01 | 01 | 01 |
| 01 | 10 | 00 |
| 01 | 11 | 01 |
| 10 | 00 | 10 |
| 10 | 01 | 00 |
| 10 | 10 | 10 |
| 10 | 11 | 10 |
| 11 | 00 | 11 |
| 11 | 01 | 11 |
| 11 | 10 | 11 |
| 11 | 11 | 11 |

| First data | Second data | Third data |
|---|---|---|
| 00 | 00 | 00 |
| 00 | 01 | 00 |
| 00 | 10 | 00 |
| 00 | 11 | 00 |
| 01 | 00 | 01 |
| 01 | 01 | 01 |
| 01 | 10 | 00 |
| 01 | 11 | 01 |
| 10 | 00 | 10 |
| 10 | 01 | 00 |
| 10 | 10 | 10 |
| 10 | 11 | 10 |
| 11 | 00 | 11 |
| 11 | 01 | 11 |
| 11 | 10 | 11 |
| 11 | 11 | 11 |

FIG. 6

APPARATUS AND METHOD FOR DRIVING DISPLAY

This application claims the benefits of U.S. provisional application No. 61/489,262, filed May 24, 2011 and Taiwan application Serial No. 100129440, filed Aug. 17, 2011, the subject matters of which are incorporated herein by reference.

BACKGROUND

1. Technical Field

The invention relates in general to an apparatus and a method for driving display.

2. Background

Referring to FIG. 1, a schematic illustration showing an apparatus for driving a conventional bi-stable display is shown. The apparatus 10 includes a shift register 12, a first latch unit 14, a second latch unit 16, a level select unit 18 and a buffer unit 19. The shift register 12 shifts a received sync signal XDIO stage by stage to output multiple latch signals with different phases to the first latch unit 14. The first latch unit 14 latches a data signal DATA n responding channels according to the latch signals from the shift register 12.

After all of the channels of the first latch unit 1 are data latched, the second latch unit 16 starts to store the latch data outputted from the first latch unit 14 at falling edges of a latch data signal LD. The level select unit 18 outputs corresponding voltage levels to the buffer unit 19 according to the receive data of the second latch unit 16. However, when the data signal DATA changes frequently, the voltage level of the buffer unit 19 may switch fast between a peak voltage and a foot voltage, so that it causes spur currents and over huge average currents, thus causing the system to crash.

SUMMARY

The disclosure is directed to an apparatus and a method for driving a display, which by comparing data corresponding to the same channels, can prevent the voltage levels of the buffer unit from varying suddenly, thereby avoiding generation of spur currents and over huge average currents.

According to a first aspect of the present disclosure, an apparatus for driving a display is provided. The apparatus includes a shift register, a first latch unit, a second latch unit, a data comparison unit and a level select unit. The shift register is for generating multiple latch signals according to a sync signal. The first latch unit is for latching a data signal in response to the latch signals to obtain multiple first data corresponding to multiple channels. The second latch unit is coupled to the first latch unit and for latching the first data of the channels as multiple second data in response to a latch data signal. The data comparison unit is for responding to the latch data signal to respectively compare the first data and the second data corresponding to the same channel to output multiple third data corresponding to the channels. The level select unit is for selecting multiple voltage levels corresponding to the channels according to the third data.

According to a second aspect of the present disclosure, a method for driving a display is provided. The method includes the following steps. Multiple latch signals are generated according to a sync signal. A data is latched in response to the latch signals to obtain multiple first data corresponding to multiple channels. The first data of the channels is latched as multiple second data in response to a latch data signal. The latch data signal is responded to, thereby respectively comparing the first data with the second data corresponding to the same channels to output multiple third data corresponding to the channels. Multiple voltage levels corresponding to the channels are selected according to the third data.

According to a third aspect of the present disclosure, an apparatus for driving a display is provided. The apparatus includes a shift register, a first latch unit, a second latch unit, and a buffer output unit. The shift register is for generating multiple latch signals according to a sync signal. The first latch unit is for latching a data signal in response to the latch signals to obtain multiple first data corresponding to multiple channels. The second latch unit is coupled to the first latch unit and for latching the first data of the channels as multiple second data in response to a latch data signal. The buffer output unit is for responding to the latch data signal to generate multiple third data corresponding to the channels respectively according to the first data and the second data corresponding to the same channels. When a difference between a first voltage level of the first data and a second voltage level of the second data exceeds a default value, a third voltage level of the third data lies between the first voltage level and the second voltage level. When the difference between the first voltage level of the first data and the second voltage level of the second data does not exceed the default value, the third voltage level of the third data is equal to the first voltage level.

According to a fourth aspect of the present disclosure, a method for driving a display is provided. The method includes the following steps. Multiple latch signals are generated according to a sync signal. A data signal is latched in response to the latch signals to obtain multiple first data corresponding to multiple channels. The first data of the channels is latched as multiple second data in response to a latch data signal. The latch data signal is responded to, thereby generating multiple third data corresponding to the channels respectively according to the first data and the second data corresponding to the same channels. When a difference between a first voltage level of the first data and a second voltage level of the second data exceeds a default value, a third voltage level of the third data lies between the first voltage level and the second voltage level. When the difference between the first voltage level of the first data and the second voltage level of the second data does not exceed the default value, the third voltage level of the third data is equal to the first voltage level.

The invention will become apparent from the following detailed description of the preferred but non-limiting embodiments. The following description is made with reference to the accompanying drawings.

BRIEF DESCRIPTION OF THE DRAWINGS

FIG. 6 shows an example of a look-up table according to an embodiment.

DETAILED DESCRIPTION OF THE INVENTION

The disclosure proposes an apparatus and a method for driving a display, comparing data corresponding to the same channels to provide a transition voltage when the data of the channels varies frequently, so that the voltage levels of the buffer unit do not vary suddenly, thereby preventing from generating spur currents and over huge average currents.

Figure 1:
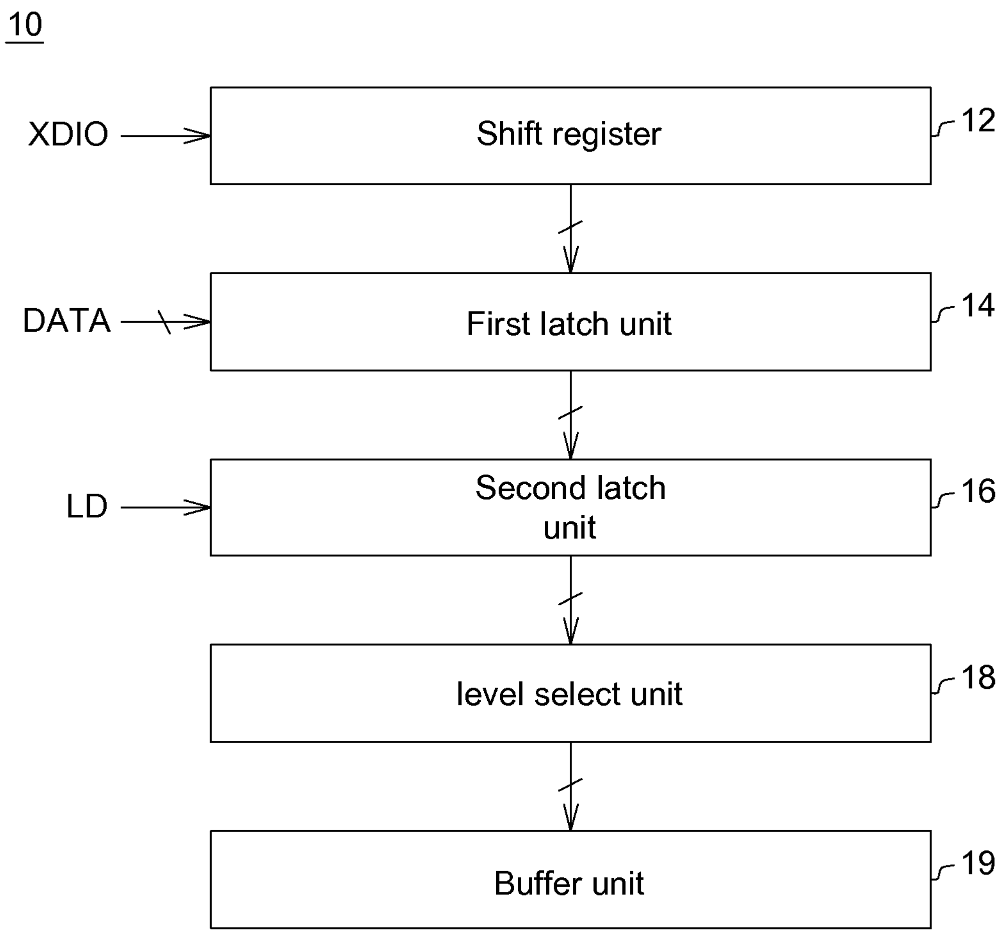
FIG. 1 (Prior Art)
FIG. 1 shows a schematic illustration showing an apparatus for driving a conventional bi-stable display.
Figure 2:
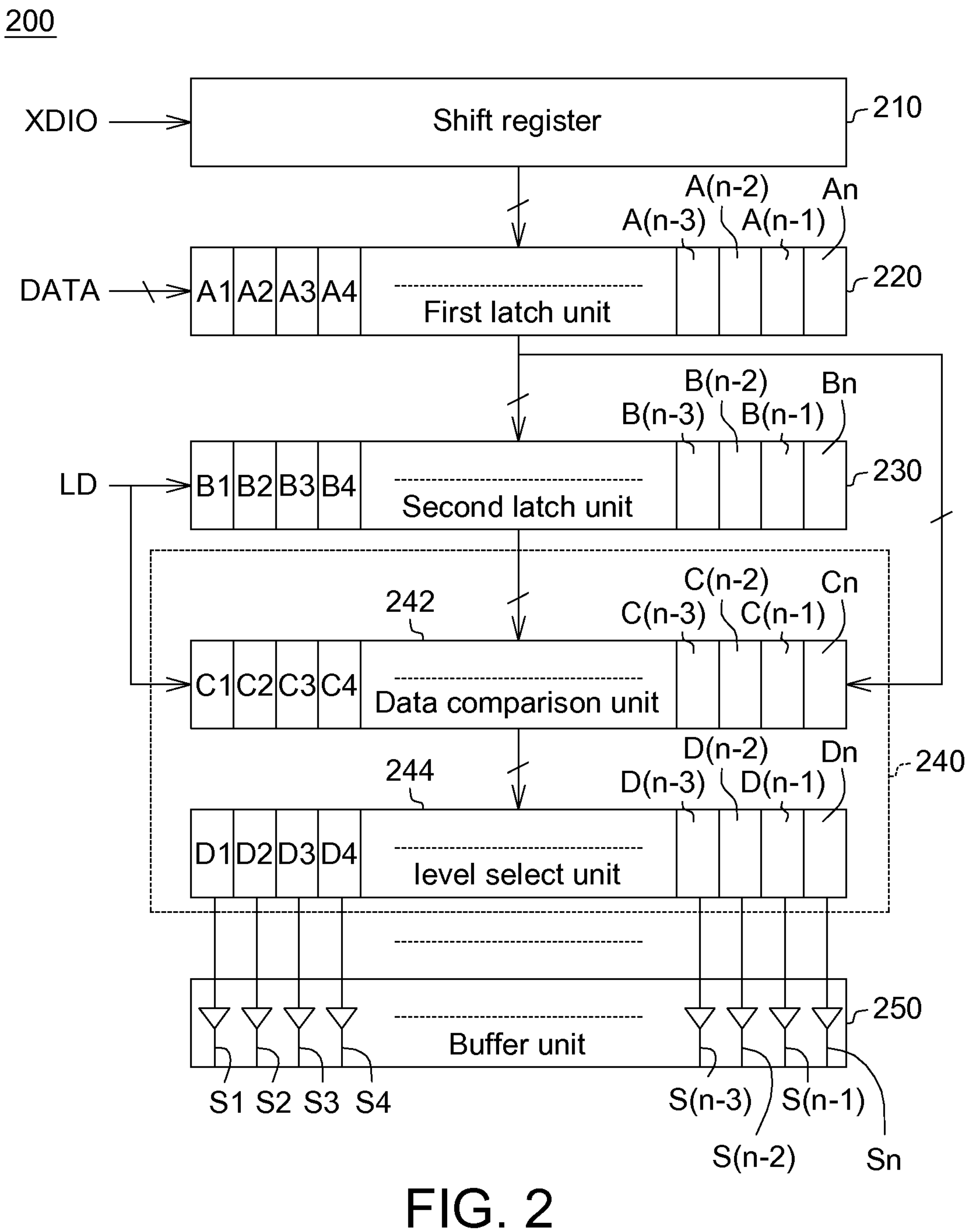
FIG. 2 shows a schematic illustration of an apparatus for driving a display according to an embodiment.

Take the display to be a bi-stable display as being exemplified, but it is not limited thereto and other types of display are applicable. Referring to FIG. 2, a schematic illustration of an apparatus for driving a display according to an embodiment is shown. The display 200 includes a shift register 210, a first latch unit 220, a second latch unit 230, a buffer output unit 240 and a buffer unit 250. The buffer output unit 240 includes a data comparison unit 242 and a level select unit 244. Corresponding to n channels, the first latch unit 220 substantially has n latches A1 to An, and the second latch unit 230 substantially has n latches B1 to Bn. The latch is such a line latch. The data comparison unit 242 substantially includes n data comparator C1 to Cn; the level select unit 244 substantially includes n level selector; the buffer unit 250 substantially includes n buffers S1 to Sn, n being a positive integer.

Figure 3:
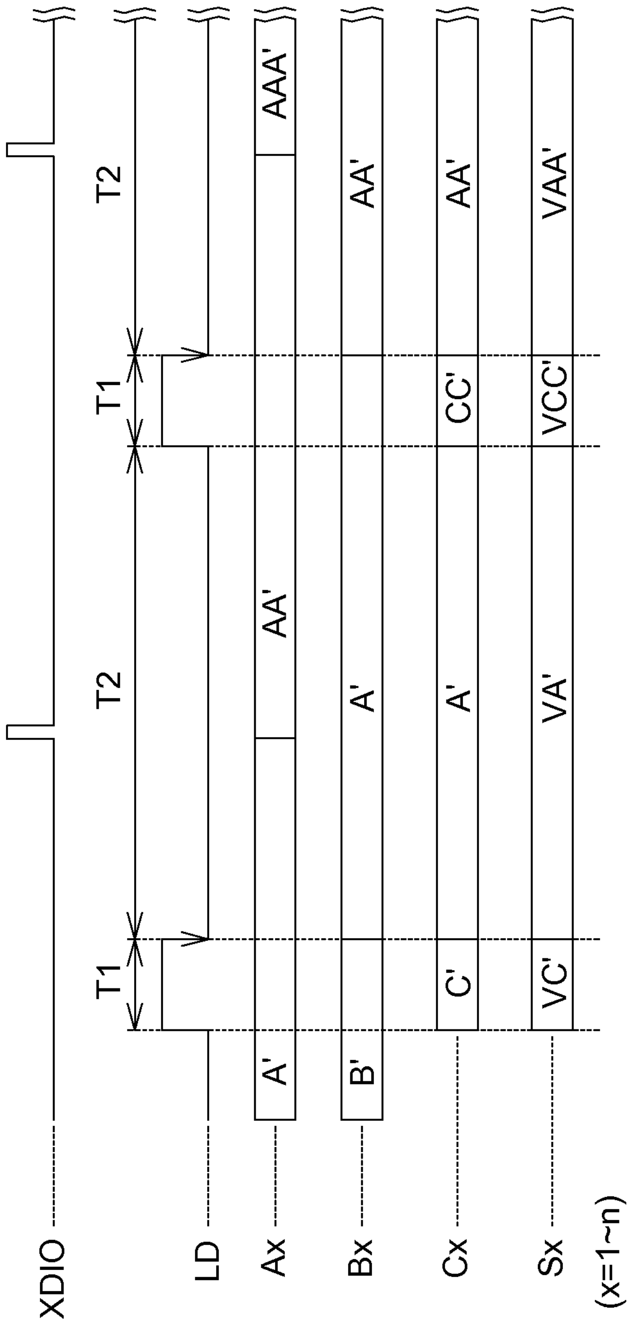
FIG. 3 shows a timing diagram of an apparatus for driving a display according to an embodiment.

Referring to FIG. 3, a timing diagram of an apparatus for driving a display according to an embodiment is shown. First, the shift register 210 shifts a received sync signal XDIO stage by stage to output n latch signals with different phases corresponding to the n channels, wherein the sync signal XDIO is such as a horizontal sync signal. The latches A1 to An latch a data signal DATA respectively according to the corresponding latch signals to obtain n first data corresponding to the n channels. The second latch unit 230 is coupled to the first latch unit 220. After the latches A1 to An are data latched, the latches B1 to Bn start to latch the n first data corresponding to the n channels as n second data in response to a latch data signal LD, for example, at falling edges of the latch data signal LD. During the period, the latch Bx substantially receives the first data of the latch Ax corresponding to the same channel to be the second data, x being a positive integer ranging from 1 to n.

In FIG. 2, the data comparator Cx respectively compares the first data stored in the latch Ax, such as A' corresponding to a current latch data signal shown in FIG. 2, with the second data stored in the latch Bx, such as B' corresponding to a previous latch data signal shown in FIG. 2, corresponding to the same channel to output third data, such as C' shown in FIG. 2, corresponding to the same channel in a data comparison period T1. In the data comparison period T1, the data comparator Cx obtains the third data according to a look-up table when it compares the first data with the second data corresponding to the same channel. Referring to Table 1 and FIG. 6, an example of a look-up table according to an embodiment is shown, but it is not limited thereto and decided according to design requirements.

TABLE 1

| First data | Second data | Third data |
|---|---|---|
| 00 | 00 | 00 |
| 00 | 01 | 00 |
| 00 | 10 | 00 |
| 00 | 11 | 00 |
| 01 | 00 | 01 |
| 01 | 01 | 01 |
| 01 | 10 | 00 |
| 01 | 11 | 01 |
| 10 | 00 | 10 |
| 10 | 01 | 00 |
| 10 | 10 | 10 |
| 10 | 11 | 10 |
| 11 | 00 | 11 |

TABLE 1-continued

| First data | Second data | Third data |
|---|---|---|
| 11 | 01 | 11 |
| 11 | 10 | 11 |
| 11 | 11 | 11 |

After that, the comparator Cx further provides the second data of the corresponding latch Bx to be the third data in a non data comparison period T2.

Preferably, the data comparison period T1 can be arranged to start at a rising edge of the latch data signal LD and reside in a period corresponding to a first level of the latch data signal LD. The duration may be determined according to a width of the latch data signal LD or an internal circuit. In addition, preferably, the non data comparison period T2 can be arranged to start at a falling edge of the latch data signal LD and reside in a period corresponding to a second level of the latch data signal LD. The non data comparison period T2 may be arranged directly next to the data comparison period T1 or following the data comparison period T1 by a time interval.

The level selector Dx selects the corresponding voltage level according to the third data outputted from the data comparator Cx corresponding to the same channel. The buffer Sx receives the voltage levels outputted from the corresponding level selector Dx and accordingly outputs a data voltage corresponding to the channel. Referring to Table 2, a corresponding table of the data of the data comparator Cx and the voltage level of the buffer Sx according to an embodiment is shown.

TABLE 2

| Data of the data comparator Cx | Voltage level of the buffer Sx |
|---|---|
| 00 | 0 volts |
| 01 | +V volts, ex. 15 volts |
| 10 | −V volts, ex. −15 volts |
| 11 | floating |

Figure 4:
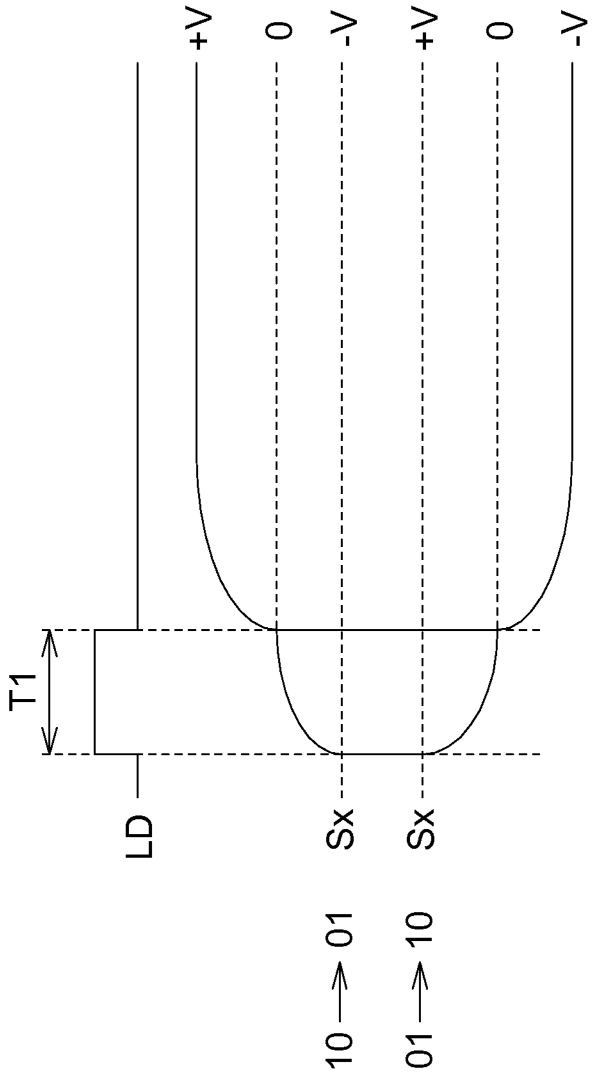
FIG. 4 shows a wave diagram of the voltage level of the buffer Sx versus the data of the data comparator Cx according to an embodiment.

It can be obtained from Table 2 that, when the data of the data comparator Cx varies between 01 and 10, the voltage level of the corresponding buffer Sx changes suddenly between +V volts and −V volts. Therefore, based on Table 1, when the second data corresponding to the previous latch data signal and the first data corresponding to the current latch data signal vary between 01 and 10, for example, from 01 to 10 or from 10 to 01, the data of the data comparator Cx is in advance changed to third data corresponding to a middle voltage level, such as 0 volt, in the data comparison period T1. Then in the non data comparison period T2, the first data corresponding to the same channel and the current latch data signal is outputted to be the third data. Consequently, the voltage level of the buffer Sx can be prevented from changing fast between the peak voltage, +V volts, and the foot voltage, −V volts. Referring to FIG. 4, a wave diagram of the voltage level of the buffer Sx versus the data of the data comparator Cx according to an embodiment is shown.

In the embodiment, it mainly compares the data corresponding to the same channel to provide a transition voltage when the data of the channel varies frequently, so that the voltage level of the buffer unit does not vary suddenly, thus avoiding generation of spur currents and over huge average currents. As mentioned above, when the second data corresponding to the previous latch data signal and the first data corresponding to the current latch data signal vary between 01 and 10, the third data is especially set to correspond to a middle voltage level, such as 0 volt. Assume that the first data corresponds to a first voltage level and the second data corresponds to a second voltage level. In other words, when a difference between the first voltage level and the second voltage level exceeds a default value, a third voltage level of the third data lies between the first voltage level and the second voltage level as a transition voltage to lighten the voltage variation. Conversely, when the difference between the first voltage level and the second voltage level does not exceed a default value, the third voltage level is equal to the first voltage level.

Figure 5:
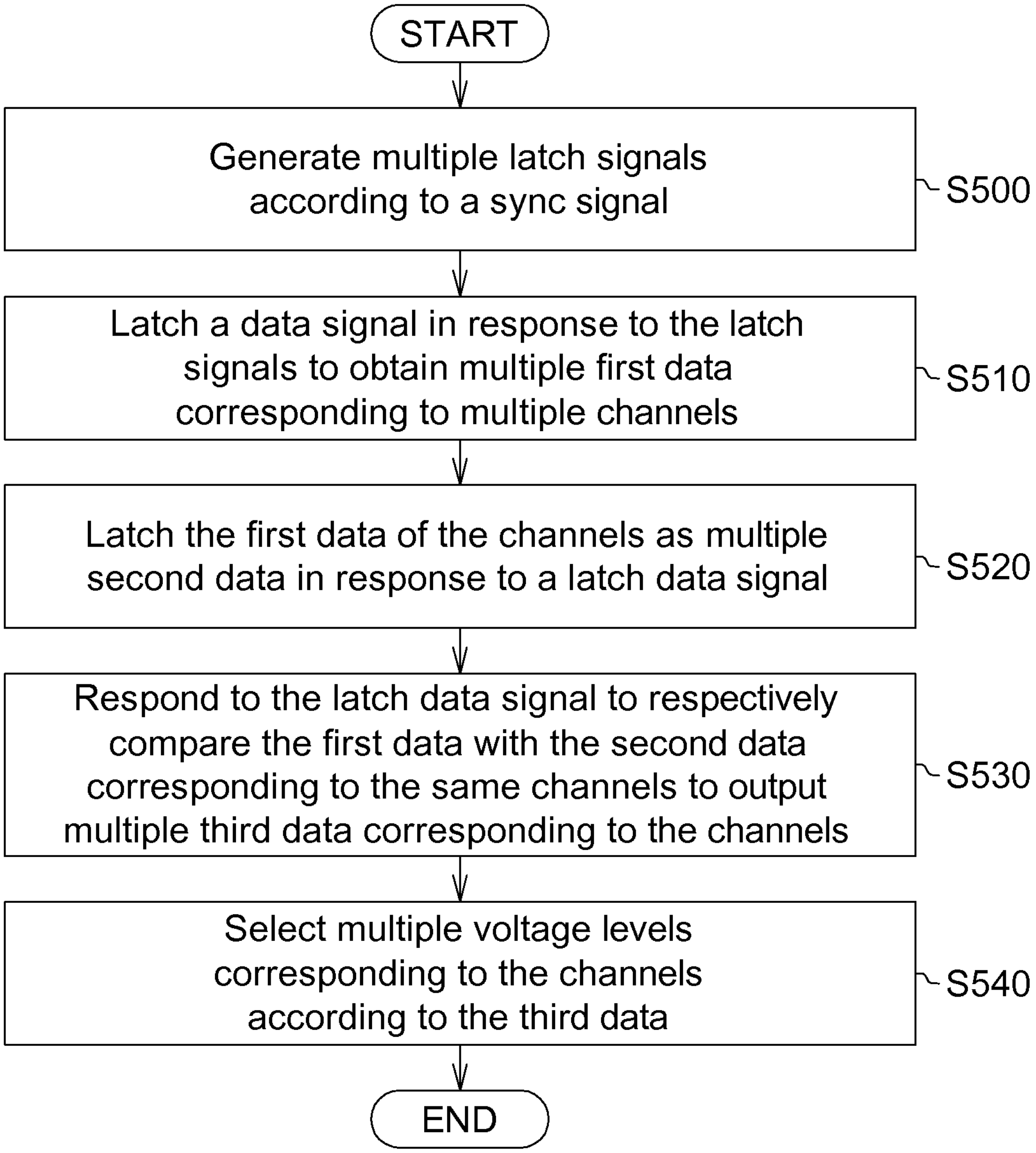
FIG. 5 shows a flow chart of a method for driving a display according to an embodiment.

The disclosure further proposes a method for driving a display. Referring to FIG. 5, a flow chart of a method for driving a display according to an embodiment is shown. In step S500, multiple latch signals are generated according to a sync signal. In step S510, a data signal is latched in response to the latch signals to obtain multiple first data corresponding to multiple channels. In step S520, the first data of the channels is latched as multiple second data in response to a latch data signal. In step S530, the latch data signal is responded to, thereby generating multiple third data corresponding to the channels respectively according to the first data and the second data corresponding to the same channels. In step S540, multiple voltage levels are selected corresponding to the channels according to the third data. When a difference between a first voltage level of the first data and a second voltage level of the second data exceeds a default value, a third voltage level of the third data lies between the first voltage level and the second voltage level. When the difference between the first voltage level of the first data and the second voltage level of the second data does not exceed the default value, the third voltage level of the third data is substantially equal to the first voltage level.

The detailed principles of the above method for driving a display have been described in FIG. 2 to FIG. 4 and related content, so detailed description thereof will be omitted.

The apparatus and the method for driving a display proposed in the disclosure compare data corresponding to the same channels in advance in the data comparison period, thus capable of providing a transition voltage when the data of the channels varies frequently, so that the voltage levels of the buffer unit do not vary suddenly, thereby preventing from generating spur currents and over huge average currents.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for driving a display, comprising:

a shift register for generating a plurality of latch signals according to a sync signal;

a first latch unit for latching a data signal in response to the latch signals to obtain a plurality of first data corresponding to a plurality of channels;

a second latch unit coupled to the first latch unit and for latching the first data corresponding to the channels as a plurality of second data in response to a latch data signal;

a data comparison unit connected to the first latch unit and the second latch unit, for receiving the first data from the first latch unit and receiving the second data from the second latch unit and comparing the first data with the second data corresponding to the same channels to output a plurality of third data corresponding to the channels; and a level select unit for selecting a plurality of voltage levels corresponding to the channels, according to the third data;

wherein when a difference between a first voltage level of the first data and a second voltage level of the second data exceeds a default value, a third voltage level of the third data lies between the first voltage level and the second voltage level;

wherein when the first voltage level of the first data is different from the second voltage level of the second data and the difference between the first voltage level of the first data and the second voltage level of the second data does not exceed the default value, the third voltage level of the third data is equal to the first voltage level.

2. The apparatus for driving a display according to claim 1, wherein the display is a bi-stable display.

3. The apparatus for driving a display according to claim 1, wherein the second latch unit performs the latching in a non-data comparison period of the latch data signal, and the data comparison unit performs the comparing in a data comparison period of the latch data signal.

4. The apparatus for driving a display according to claim 3, wherein the data comparison unit further provides the second data to be the third data in the non-data comparison period of the latch data signal.

5. The apparatus for driving a display according to claim 3, wherein the data comparison period starts at a rising edge of the latch data signal, and the non-data comparison period starts at a falling edge of the latch data signal.

6. The apparatus for driving a display according to claim 3, wherein the data comparison period occurs during a period corresponding to a first level of the latch data signal, and the non-data comparison period starts during a period corresponding to a second level of the latch data signal.

7. The apparatus for driving a display according to claim 1, wherein the data comparison unit compares the first data corresponding to a current latch data signal with the second data corresponding to a previous latch data signal.

8. The apparatus for driving a display according to claim 1, wherein the data comparison unit obtains the third data according to a look-up table when it compares the first data with the second data corresponding to the same channels.

9. The apparatus for driving a display according to claim 1, further comprising a buffer unit coupled to the level select unit and for receiving the voltage levels and accordingly outputting a plurality of data voltages.

10. A method for driving a display, comprising:

(i) generating a plurality of latch signals according to a sync signal;

(ii) latching a data signal in response to the latch signals to obtain a plurality of first data corresponding to a plurality of channels;

(iii) latching the first data of the channels as a plurality of second data in response to a latch data signal;

(iv) simultaneously receiving the first data and the second data and comparing the first data with the second data corresponding to the same channels to output a plurality of third data corresponding to the channels; and (v) selecting a plurality of voltage levels corresponding to the channels, according to the third data;

wherein when a difference between a first voltage level of the first data and a second voltage level of the second data exceeds a default value, a third voltage level of the third data lies between the first voltage level and the second voltage level;

wherein when the first voltage level of the first data is different from the second voltage level of the second data and the difference between the first voltage level of the first data and the second voltage level of the second data does not exceed the default value, the third voltage level of the third data is equal to the first voltage level.

11. The method for driving a display according to claim 10, wherein the display is a bi-stable display.

12. The method for driving a display according to claim 10, wherein the step (iii) performs the latching in a non-data comparison period of the latch data signal, and the step (iv) performs the comparing in a data comparison period of the latch data signal.

13. The method for driving a display according to claim 12, further providing the second data to be the third data in the non-data comparison period of the latch data signal.

14. The method for driving a display according to claim 12, wherein the data comparison period starts at a rising edge of the latch data signal, and the non-data comparison period starts at a falling edge of the latch data signal.

15. The method for driving a display according to claim 12, wherein the data comparison period occurs during a period corresponding to a first level of the latch data signal, and the non-data comparison period starts during a period corresponding to a second level of the latch data signal.

16. The method for driving a display according to claim 10, wherein the step (iv) further compares the first data corresponding to a current latch data signal with the second data corresponding to a previous latch data signal.

17. The method for driving a display according to claim 10, wherein the step (iv) uses a look-up table to obtain the third data.

18. An apparatus for driving a display, comprising:

a shift register for generating a plurality of latch signals according to a sync signal;

a first latch unit for latching a data signal in response to the latch signals to obtain a plurality of first data corresponding to a plurality of channels;

a second latch unit coupled to the first latch unit and for latching the first data of the channels as a plurality of second data in response to a latch data signal; and a buffer output unit connected to the first latch unit and the second latch unit, for receiving the first data from the first latch unit and receiving the second data from the second latch unit and generating a plurality of third data corresponding to the channels respectively according to the first data and the second data corresponding to the same channels;

wherein when a difference between a first voltage level of the first data and a second voltage level of the second data exceeds a default value, a third voltage level of the third data lies between the first voltage level and the second voltage level;

wherein when the first voltage level of the first data is different from the second voltage level of the second data and the difference between the first voltage level of the first data and the second voltage level of the second data does not exceed the default value, the third voltage level of the third data is equal to the first voltage level.

19. The apparatus for driving a display according to claim 18, wherein the display is a bi-stable display.

20. The apparatus for driving a display according to claim 18, wherein the buffer output unit comprises:

a data comparison unit for responding to the latch data signal to respectively compare the first data with the second data corresponding to the same channels to output the third data corresponding to the channels; and a level select unit for selecting a plurality of voltage levels corresponding to the channels, according to the third data.

21. The apparatus for driving a display according to claim 20, further comprising a buffer unit coupled to the level select unit and for receiving the voltage levels and accordingly outputting a plurality of data voltages.

22. The apparatus for driving a display according to claim 20, wherein the second latch unit performs the latching in a non-data comparison period of the latch data signal, and the data comparison unit performs the comparing in a data comparison period of the latch data signal.

23. The apparatus for driving a display according to claim 22, wherein the data comparison unit further provides the second data to be the third data in the non-data comparison period of the latch data signal.

24. The apparatus for driving a display according to claim 22, wherein the data comparison period starts at a rising edge of the latch data signal, and the non-data comparison period starts at a falling edge of the latch data signal.

25. The apparatus for driving a display according to claim 22, wherein the data comparison period occurs during a period corresponding to a first level of the latch data signal, and the non-data comparison period starts during a period corresponding to a second level of the latch data signal.

26. The apparatus for driving a display according to claim 20, wherein the data comparison unit compares the first data corresponding to a current latch data signal with the second data corresponding to a previous latch data signal.

27. The apparatus for driving a display according to claim 20, wherein the data comparison unit obtains the third data according to a look-up table when it compares the first data with the second data corresponding to the same channels.

28. A method for driving a display, comprising:

(a) generating a plurality of latch signals according to a sync signal;

(b) latching a data signal in response to the latch signals to obtain a plurality of first data corresponding to a plurality of channels;

(c) latching the first data of the channels as a plurality of second data in response to a latch data signal; and (d) simultaneously receiving the first data and the second data to generate a plurality of third data corresponding to the channels respectively according to the first data and the second data corresponding to the same channels;

wherein when a difference between a first voltage level of the first data and a second voltage level of the second data exceeds a default value, a third voltage level of the third data lies between the first voltage level and the second voltage level, and when the first voltage level of the first data is different from the second voltage level of the second data and the difference between the first voltage level of the first data and the second voltage level of the second data does not exceed the default value, the third voltage level of the third data is equal to the first voltage level.

29. The method for driving a display according to claim 28, wherein the display is a bi-stable display.

30. The method for driving a display according to claim 28, wherein the step (d) comprises:

(d1) responding to the latch data signal to respectively compare the first data with the second data corresponding to the same channels to output the third data corresponding to the channels; and (d2) selecting a plurality of voltage levels corresponding to the channels, according to the third data.

31. The method for driving a display according to claim 30, wherein the step (c) performs the latching in a non-data comparison period of the latch data signal, and the step (d) performs the comparing in a data comparison period of the latch data signal.

32. The method for driving a display according to claim 31, wherein the step (d1) further provides the second data to be the third data in the non-data comparison period of the latch data signal.

33. The method for driving a display according to claim 30, wherein the data comparison period starts at a rising edge of the latch data signal, and the non-data comparison period starts at a falling edge of the latch data signal.

34. The method for driving a display according to claim 30, wherein the data comparison period locates during a period corresponding to a first level of the latch data signal, and the non-data comparison period starts during a period corresponding to a second level of the latch data signal.

35. The method for driving a display according to claim 30, wherein the step (d1) further compares the first data corresponding to a current latch data signal with the second data corresponding to a previous latch data signal.

36. The method for driving a display according to claim 30, wherein the step (d1) obtains the third data according to a look-up table.

37. An apparatus for driving a display, comprising:

a shift register for generating a plurality of latch signals according to a sync signal;

a first latch unit for latching a data signal in response to the latch signals to obtain a plurality of first data corresponding to a plurality of channels;

a second latch unit coupled to the first latch unit and for latching the first data of the channels as a plurality of second data in response to a latch data signal;

a data comparison unit for simultaneously receiving the first data from the first latch unit and receiving the second data from the second latch unit and respectively comparing the first data with the second data corresponding to the same channels to output a plurality of third data corresponding to the channels; and a level select unit for selecting a plurality of voltage levels corresponding to the channels, according to the third data;

wherein when a difference between a first voltage level of the first data and a second voltage level of the second data exceeds a default value, a third voltage level of the third data lies between the first voltage level and the second voltage level;

wherein when the first voltage level of the first data is different from the second voltage level of the second data and the difference between the first voltage level of the first data and the second voltage level of the second data does not exceed the default value, the third voltage level of the third data is equal to the first voltage level.

38. An apparatus for driving a display, comprising:

a shift register for generating a plurality of latch signals according to a sync signal;

a first latch unit for latching a data signal in response to the latch signals to obtain a plurality of first data corresponding to a plurality of channels;

a second latch unit coupled to the first latch unit and for latching the first data of the channels as a plurality of second data in response to a latch data signal; and a buffer output unit, for responding to the latch data signal to simultaneously receive the first data from the first latch unit and receive the second data from the second latch unit and generate a plurality of third data corresponding to the channels respectively according to the first data and the second data corresponding to the same channels;

wherein when a difference between a first voltage level of the first data and a second voltage level of the second data exceeds a default value, a third voltage level of the third data lies between the first voltage level and the second voltage level;

wherein when the first voltage level of the first data is different from the second voltage level of the second data and the difference between the first voltage level of the first data and the second voltage level of the second data does not exceed the default value, the third voltage level of the third data is equal to the first voltage level.

* * * * *